R. PAYTON.
PLOW.
APPLICATION FILED APR. 8, 1911.
1,018,076.
Patented Feb. 20, 1912.
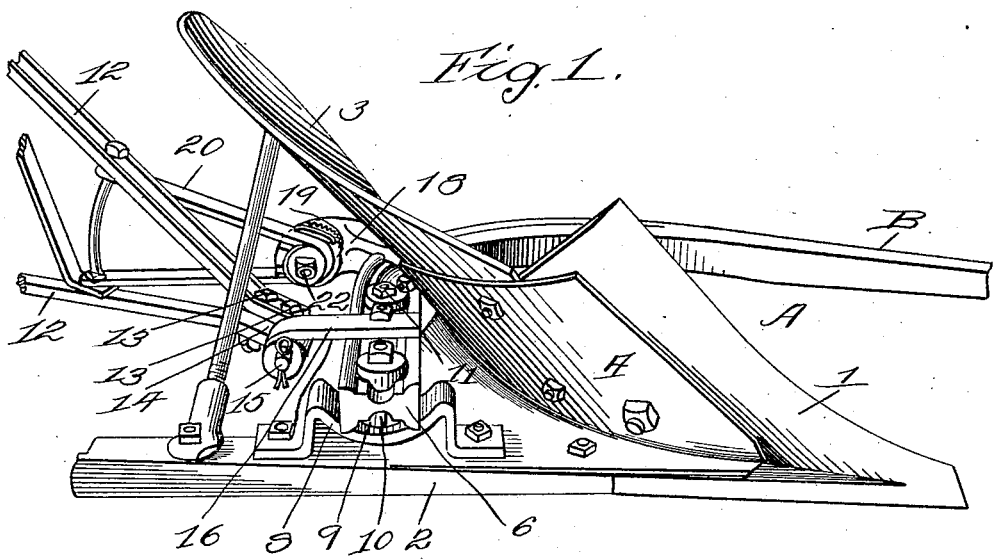
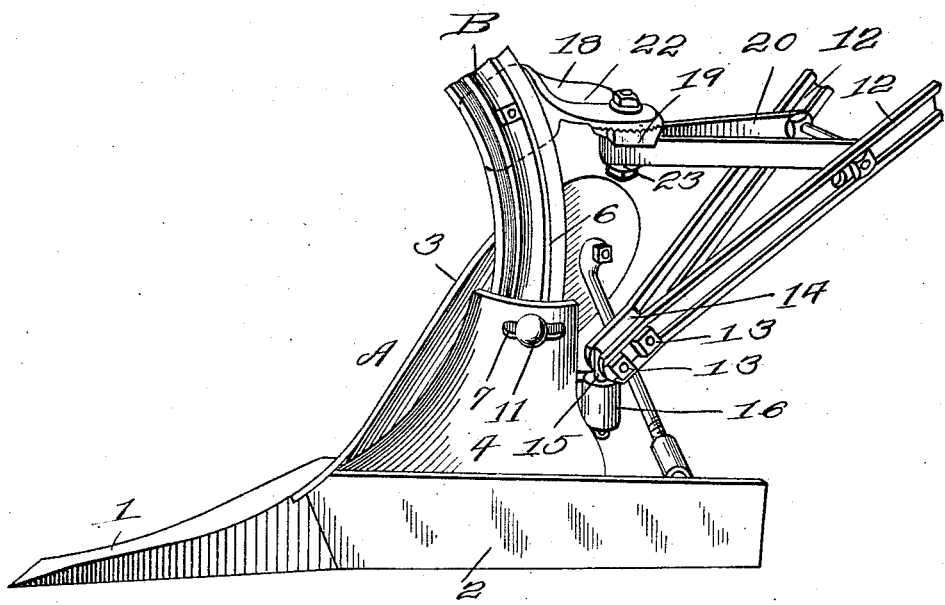
Witnesses
Inventor
Richard Payton
By H. H. Bliss
Attorney

UNITED STATES PATENT OFFICE.

RICHARD PAYTON, OF MOLINE, ILLINOIS, ASSIGNOR TO DEERE & COMPANY, A CORPORATION OF ILLINOIS.

PLOW.

1,018,076.  Specification of Letters Patent.  Patented Feb. 20, 1912.

Original application filed December 24, 1908, Serial No. 469,075. Divided and this application filed April 8, 1911. Serial No. 619,850.

*To all whom it may concern:*

Be it known that I, RICHARD PAYTON, a citizen of the United States, residing at Moline, in the county of Rock Island and State of Illinois, have invented certain new and useful Improvements in Plows, of which the following is a specification, reference being had therein to the accompanying drawing.
This invention relates to improvements in plows, and more especially in plow handle mountings.

One of the objects of the invention is to provide a plow handle mounting having improved connections for angular adjustment about a vertical axis.

Other objects are to provide certain improved structural features, which will be fully described in the following specification.

Of the drawings, Figure 1 is a perspective view showing a plow embodying my invention lying on its side. Fig. 2 is a side perspective view of the plow.
In the drawings, A represents the plow body, comprising a share 1, a landside 2, a moldboard 3, and a frame or frog 4, to which the share, the landside and the moldboard are connected by means of bolts or rivets.

B represents the plow beam which is preferably formed of a single steel forging. The beam comprises a forward horizontal portion 5 and a rearward vertical portion or standard 6.

The upper part of the frog 4 is formed with a vertical concave part in which is a horizontal slotted hole 7. Secured to the lower part of the plow body is a bracket 8 having a vertical concave surface in alinement with the vertical concave surface of the frog. This bracket is provided with a horizontal slotted hole 9. Bolts 10 and 11 are provided which extend through the slotted holes 7 and 9 in the frog and the bracket respectively and through suitable apertures in the standard 6. By means of washers and nuts on the bolts 10 and 11 the standard may be rigidly clamped against the curved surface of the frog and of the bracket and held in any desired position.

It will be understood that while the means of connection between the beam and the body which I have described is the one which I deem preferable, other means of connection can be used as desired so far as my present invention is concerned.

12, 12 represent handle bars which converge toward their forward ends at which they are connected by means of bolts 13, 13 to a pivot piece 14, provided with a vertical pivot pin 15.

16 is a horizontal rearward extending bracket pivoted or otherwise secured at its forward end to the lower part of the standard. The rear end of the bracket 16 is provided with an eye or bearing in which the pin 15 is mounted. The pin is held in place by means of a cotter 17.

18 is a second bracket also secured at its forward end to the standard 6. It is provided with a vertical aperture in substantial alinement with the bearing aperture in the rear end of the bracket 16. The lower surface of the bracket 18 is provided with a series of radial notches arranged concentrically with the aperture.

19 is a washer or securing plate provided with a vertical aperture adapted to register with the aperture in the bracket 18, and with teeth adapted to mesh with the notches of the bracket.

20 represents a V-shaped strap which is connected at its rear end to the handle bars 12, 12 by means of the transverse threaded rod 21 extending through suitable apertures in the strap and in the handle bars. The forward part of the strap engages the washer or retaining plate 19 and is held in place against horizontal movement by means of suitable depending lugs or flanges. A bolt or pivot pin 22 extends through the aperture in the bracket and in the plate and carries at its lower headed end a washer 23 which bears against the lower edge of the strap and serves to hold the strap in firm engagement with the plate 19.

It will be observed that by my invention I have provided a handle mounting which is connected to the beam independently of the body and which permits angular adjustment of the handles by the loosening of a single bolt 22. In addition to this the handle mounting is provided with two separated alined pivots which serve to give it very rigid support against vertical tilting.

The unitary V-shaped strap 20 for connecting the upper pivot with the handle bars is another advantageous feature.

I do not herein claim the specific form of connection between the beam and the body, or the provision in a plow of independent pivotal connections between the beam and the handles and the beam and the body. These features are described and covered in my copending application for plows, filed Dec. 24, 1908, Serial No. 469,075, of which this application is a division.

What I claim is:

1. In a plow comprising a body and a beam, the combination of two separate pivot elements arranged one substantially vertically above the other, means for mounting both of the elements for angular adjustment relative to the body and beam about a common substantially vertical axis, and a handle mounting provided with independent connections to each of the said elements.

2. In a plow comprising a body and a beam, the combination of two separated brackets provided with alined substantially vertical apertures, two handle bars converging toward their lower forward ends, a pivot piece connected with the lower forward ends of the bars and provided with a pivot pin adapted to extend within the lower of the said apertures, a pivot pin adapted to extend within the upper of the said apertures, a connection between the second pivot pin and the bars, the said bars and the said connection being adjustable together with respect to the body and beam about the said pins, and means for locking the bars in adjusted position against movement about the pins.

3. In a plow, two separated elements provided with alined substantially vertical apertures, a handle mounting, two separate alined pivot devices connected with the handle mounting and extending respectively into the apertures of the two brackets, and a device for locking the handle mounting directly to one of the brackets to prevent relative angular movement.

4. In a plow, the combination of a beam provided with a substantially vertical rear end portion forming a standard, a plow body secured to the standard, two separate rearward extending brackets secured at their forward ends to the standard and provided at their rear ends with alined apertures, a handle mounting, two separate alined pivot devices connected with the handle mounting and extending respectively into the apertures of the two brackets, and a device for locking the handle mounting directly to one of the brackets to prevent relative angular movement.

5. In a plow, the combination of a beam provided with a substantially vertical rear end portion forming a standard, a plow body secured to the standard, a rearward extending bracket secured at its forward end to the standard and provided at its rear end with vertical apertures, a handle mounting, a pivot device connected with the handle mounting and extending into the apertures in the bracket, a second bracket secured to the standard and provided with a vertical aperture in alinement with that of the first bracket, the said second bracket being provided with radial notches arranged concentrically with the said aperture, a plate secured to the handle mounting and provided with an aperture adapted to register with that of the second bracket and with teeth adapted to engage the notches of the second bracket, and a bolt extending through the apertures in the bracket and plate for securing them, together with the handle mounting, in adjusted position.

6. In a plow, two separate elements arranged one substantially above the other, means for mounting both of the elements for angular adjustment about a common substantially vertical axis, two handle bars converging toward their lower forward ends and connected at their lower forward ends to the lower of the two said elements, and a V-strap with its diverging ends extending rearward and connected to the two handle bars and with its forward part secured to the upper of the two said elements.

7. In a plow, two handle bars converging toward their lower forward ends, a device for pivotally mounting the said bars at the said lower forward ends, a bracket above the said device provided with a vertical aperture and with a horizontal surface, a plate in engagement with the said horizontal surface of the bracket, and provided with an aperture in register with that of the bracket, a V-strap with its diverging ends extending rearward and connected to the two handle bars and a single bolt engaging the V-strap and extending through the plate and bracket apertures to lock together the V-strap, the plate and the bracket.

In testimony whereof I affix my signature, in presence of two witnesses.

RICHARD PAYTON.

Witnesses:
H. E. RICH,
A. A. CONWELL.